United States Patent [19]

Friedman

[11] 4,298,267
[45] Nov. 3, 1981

[54] PROCESSING ROLLER CLEANER
[75] Inventor: Harvey S. Friedman, Sudbury, Mass.
[73] Assignee: Polaroid Corporation, Cambridge, Mass.
[21] Appl. No.: 162,408
[22] Filed: Jun. 24, 1980
[51] Int. Cl.³ ............................................. G03D 5/02
[52] U.S. Cl. ...................................... 354/304; 354/86; 118/104
[58] Field of Search ........................ 354/84, 85, 86, 87, 354/303, 304, 318; 118/70, 104, 203

[56] References Cited

U.S. PATENT DOCUMENTS

| | | | |
|---|---|---|---|
| 3,271,187 | 9/1966 | Chen et al. | 354/318 |
| 3,330,196 | 7/1967 | Chen et al. | 354/318 |
| 3,357,337 | 12/1967 | Land et al. | 354/318 |
| 3,590,707 | 7/1971 | Merz | 354/86 |
| 3,640,203 | 2/1972 | Raab et al. | 354/318 |
| 3,769,896 | 11/1973 | Samuels et al. | 118/104 |
| 4,005,446 | 1/1977 | Friedman | 354/86 |

FOREIGN PATENT DOCUMENTS 2522603  12/1976  Fed. Rep. of Germany .

Primary Examiner—L. T. Hix
Assistant Examiner—Alan Mathews
Attorney, Agent, or Firm—Alfred E. Corrigan

[57] ABSTRACT

A roller assembly mounted in a housing of a camera and adapted to spread a processing liquid across an exposed film unit as it is being advanced between the rollers of the assembly so as to initiate the formation of a visible image within the film unit. A pair of wiper blades are mounted adjacent one of the rollers such that they may engage opposite ends of the roller, during passage of a film unit therebetween, so as to remove particulate material therefrom. The two wiper blades are integral parts of two members which also function to releasably hold a film unit by its end after it has moved out of engagement with the rollers.

4 Claims, 2 Drawing Figures

PROCESSING ROLLER CLEANER

BACKGROUND OF THE INVENTION

1. Field of the Invention

This invention relates to a roller assembly for spreading a processing liquid across an exposed film unit and, more particularly, to means for removing particulate matter from at least one of the rollers of the assembly.

2. Description of the Prior Art

In photographic apparatus of the self-developing type, a processing liquid is spread across an exposed photosensitive area of a sheet of photographic film so as to initiate the formation of a visible image. In some applications the processing liquid is applied to the surface of a roller which, in turn, applies the processing liquid to the exposed sheet of film. This liquid, if allowed to evaporate, leaves a deleterious residue on the roller which adversely affects future coating operations. Accordingly, means have been provided for removing the processing liquid after the coating operation. E.g., see U.S. Pat. Nos. 3,357,337 and 3,271,187 wherein wiper blades are used to remove such residue from the peripheral surface of a roller.

In other applications, the apparatus for spreading the processing liquid across the exposed photographic film comprises a pair of juxtaposed rollers between which the film is adapted to be advanced, either manually or by having one of the rollers driven by a motor. In one such application (see U.S. Pat. No. 3,590,707) the processing liquid is spread between an exposed photosensitive sheet and a superposed image-receiving sheet so as to initiate the formation of a visible image in the latter. During the spreading operation, some of the processing liquid may accidentally leak from between the lateral edges of the superposed sheets and be deposited upon the surface of one of the rollers. As is well known in the art, if this liquid is allowed to dry upon the roller, it will leave a residue thereupon which, like other particulate material, may adversely affect the future spreading of processing liquid between the superposed sheets of subsequent film units. It is for this reason that the spread roller assembly of U.S. Pat. No. 3,590,707 is automatically elevated to an inspection and cleaning position upon opening the back of the camera.

The accidental leakage of processing liquid from between the edges of the superposed sheets of the film unit during the spreading operation has been greatly reduced since the introduction of integral type film units of the type disclosed in U.S. Pat. No.4,005,446 and in German Pat. No. 2,522,603. This is accomplished, at least in part, by sealing the superposed edges with a mask. However, the problem of keeping the surfaces of the rollers free from foreign matter, such as that caused by accidental edge leakage, transfer of particles of sheet material from the film unit itself to the roller, etc., still remains a reality, as evidenced by the aforementioned German patent. In this patent, the opening to the film chamber is sized such that the user thereof may reach the rollers with cleaning means so as to enable cleaning thereof. But, this solution requires frequent inspections by the user in order to be effective. Accordingly, it can be seen that there is a need for a simple, inexpensive means for automatically removing foreign material from the surface of a roller.

SUMMARY OF THE INVENTION

The instant invention relates to apparatus including a pair of elongate rollers for spreading a processing liquid across an exposed area of a photographic film unit so as to initiate the formation of a visible image therein and, more particularly, to means for removing foreign material from at least one of the rollers during rotation thereof.

The apparatus includes a housing for supporting a spread roller assembly adjacent to and in closing relation to an end of a film chamber. An end wall of the housing is provided with a slot which provides communication between the interior and exterior of the housing and through which an exposed film unit is adapted to be advanced by the spread roller assembly. A coiled resilient sheet formed from an opaque material extends across the slot so as to prevent the passage of light into the housing. As an exposed film unit exits from the housing via the slot, its leading edge engages the coiled sheet and uncoils it such that the opaque sheet overlies the film unit so as to temporarily prevent light from striking the covered surface of the film unit.

The spread roller assembly is mounted within the housing adjacent to the slot and includes a U-shaped bracket for supporting a pair of elongate rollers in juxtaposed relation such that their peripheral surfaces define a pressure-generating gap into which an exposed film unit is adapted to be advanced. A spring resiliently urges one of the rollers toward the other roller.

A pair of Z-shaped members, formed from any suitable resilient material, are mounted adjacent opposite ends of the housing such that one leg of each member extends into but not through the slot in the housing. The opposite leg of each member extends in a direction opposite to that of the first leg to a position adjacent to, but not in engagement with, an end of the spring biased roller. As an exposed film unit is advanced between the two rollers, its thickness moves the spring biased roller away from the other roller and into engagement with the adjacent legs of the Z-shaped members. As the rollers rotate during the spreading of a processing liquid across the exposed area of the film unit, the legs of the Z-shaped members function to remove any foreign matter that may be on the adjacent peripheral surfaces of the spring biased roller. This cleansing action assures that the maximum gap or spacing between the two rollers will not exceed the thickness of the exposed film unit which, in turn, controls the maximum thickness of the layer of processing liquid spread by the rollers. Thus, cleaning the ends of the roller contributes to maintaining the thickness of the spread within its predetermined limits. As the exposed film unit exits from between the rollers, its leading edge moves between the other end of each of the Z-shaped members and a wall of the slot. The ends of the Z-shaped members cooperate with the wall to releasably hold the film unit by its trailing end after it has moved out of engagement with the rollers until it can be fully removed from the housing by the user of the camera.

An object of the invention is to provide apparatus including a spread roller assembly with means for removing foreign matter from a spread roller as an exposed film unit is being processed thereby.

Another object of the invention is to provide apparatus for spreading a processing liquid across an exposed film unit so as to initiate the formation of a visible image therein with means which not only cleans a roller of such an apparatus but also cooperates with a wall of the apparatus to releasably grasp the film unit by an end thereof so as to maintain it in engagement with the apparatus.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWING

For a fuller understanding of the nature and objects of the invention, reference should be had to the following detailed description taken in connection with the accompanying drawing wherein.

DETAILED DESCRIPTION OF THE INVENTION

Figures 1, 2:
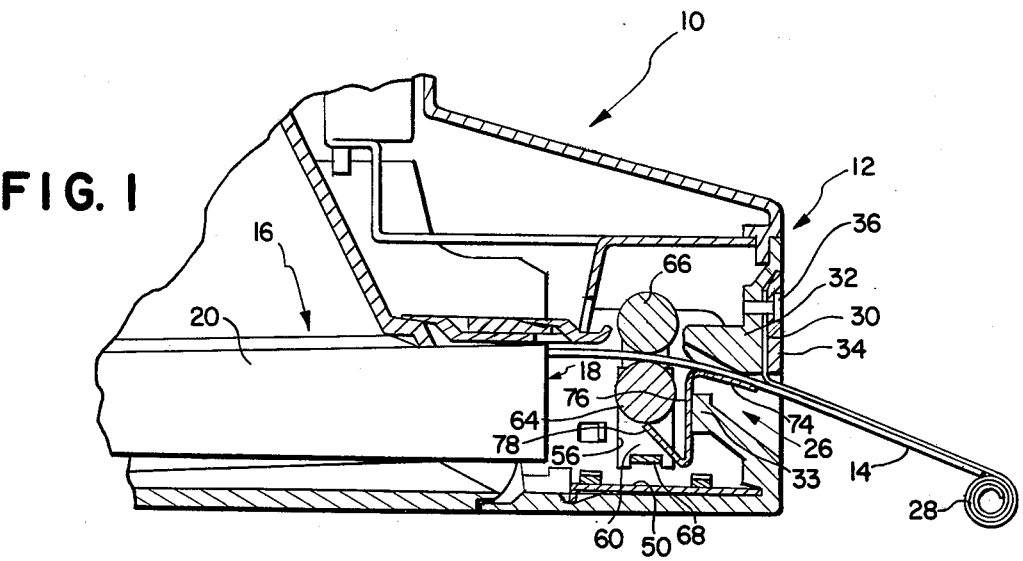
FIG. 1 is an elevational view, partly in section, of a front end of a camera of the instant or self-developing type.
FIG. 2 is a perspective view of the spread roller housing and assembly shown in FIG. 1.

Reference is now made to FIG. 1 of the drawing wherein is shown a portion of a camera 10 having apparatus 12 mounted at one end thereof for spreading a processing liquid across an exposed area of a film unit 14 so as to initiate the formation of a visible image within the film unit. The camera 10, which preferably is of the type shown in the aforementioned U.S. Pat. No. 4,005,446, includes a film chamber having an open end 18 through which a film cassette 20 of the type shown in said '446 patent is loaded into the film chamber 16.

The open end 18 of the film chamber 16 is adapted to be closed off by the apparatus 12 which includes a housing 22 for supporting a spread roller assembly 24. The housing 22 is provided with a laterally extending slot 26 for enabling the passage of the exposed film unit 14 to the exterior of the camera 10. A coiled resilient sheet 28 of opaque material has one of its ends 30 fixedly secured between a wall 32 of the housing 22 and a face plate 34 by a plurality of plastic studs 36 (only one being shown). The coiled sheet 28 normally extends across the slot 26 in lighttight relation thereto so as to prevent the admission of ambient light into the housing 22.

The spread roller assembly 24 is adapted to be supported within the housing 22, as shown in FIG. 1, and retained in place by suitable means such as tabs 38 ad 40 and complementary recesses 42 and 44. The spread roller assembly 24 includes a U-shaped bracket having a pair of legs 46 and 48 extending upwardly from opposite ends of a base portion 50. Each of the legs 46 and 48 includes a hole 52 and 54 for rotatably receiving pins (not shown) on the camera's main body to thereby pivotally connect the spread roller assembly 24 and the housing 22 to the remainder of the camera 10. Each of the legs 46 and 48 also includes a vertically extending slot 56 and 58 which is adapted to guide a movable bearing block 60 and 62, respectively. The bearing blocks 60 and 62 are adapted to rotatably support the ends of a first elongate roller 64 for movement toward and away from a second elongate roller 66. Biasing means in the form of a spring 68 is provided for resiliently biasing the bearings 60 and 62 upwardly against suitable stops (not shown) so as to provide a gap of minimum depth between the peripheral surfaces of the rollers 64 and 66. A drive gear 68 is fixedly secured to one end of the second roller 66 and is adapted to be automatically meshed with the camera's gear train (not shown) upon pivoting of the housing 22 into the position shown in FIG. 1.

As is well known in the art, the rollers 64 and 66 are adapted to receive therebetween an exposed film unit 14, as it is being advanced from its location within the film cassette 20, and rupture a container of processing liquid secured to a leading end (the right in FIG. 1) thereof and spread its contents across a photosensitive area of the film unit so as to initiate the formation of a visible image within the film unit. Simultaneously therewith, the exposed film unit 14 is advanced into the slot 26 until the leading edge of the film unit 14 engages the coiled sheet 28. Further movement of the film unit 14 results in the sheet 28 being uncoiled such that it progressively covers areas of the exposed film unit as it emerges from the camera to thereby temporarily protect the underlying areas of the film unit 14 from exposure to the ambient light. Eventually, the sheet 28 is completely uncoiled and the leading edge of the advancing film unit 14 moves past the free or unattached end of the sheet 28 thereby enabling it to return to its original coiled configuration extending across the slot 26. At this moment, the trailing end of the exposed film unit 14 has just moved out of engagement with the rollers and it is releasably held in place by a pair of resilient Z-shaped members 70 and 72 located adjacent lateral ends of the slot 26.

The construction of the members 70 and 72 is identical and, accordingly, only the member 70 will be further described. The Z-shaped member 70 includes a first end 74 which extends into the slot 26 in a manner similar to that shown in U.S. Pat. No. 4,005,446, an intermediate portion 76 which is secured to a flange 33 of the housing 22, and a second end 78 which extends in a direction opposite to that of the first end 74 and terminates at a point below but not in contact with the peripheral surface of the end of the first elongate roller 64. The Z-shaped member 72 is similarly located adjacent the opposite end of the first elongate roller 64.

When the leading edge of the exposed film unit 14 enters the bite between the first and second rollers 64 and 66, its thickness causes the rotating first roller to move downwardly a distance substantially equal to the thickness of that portion of the film unit 14 which is located between the rollers. This downward movement of the first elongate roller 64 moves its rotating peripheral surface into engagement with the second ends 78 of the Z-shaped members 70 and 72 which, in turn, now function as wiper blades to remove any particulate matter which may be on the opposite ends of the first elongate roller 64. Also, as the leading edge of the film unit 14 emerges from the bite of the rollers 64 and 66, it passes between the first ends 74 of the Z-shaped members 70 and 72 and the wall 32 of the housing 22. Thereafter, the first ends 74 cooperate with the wall 32 to maintain a small frictional force on the lateral sides of the emerging film unit so as to releasably hold the exposed film unit after it has moved out of engagement with the first and second rollers 64 and 66.

Since certain changes may be made in the above-described apparatus without departing from the scope of the invention herein involved, it is intended that all matter contained in the description thereof or shown in the accompanying drawings shall be interpreted as illustrative and not in a limiting sense. For example, while the means for cleaning the roller has been described as a pair of wiper blades, it is within the scope of the invention to replace the two blades with a single blade having a length substantially equal to that of the adjacent roller and the film unit retaining ends could be formed as separate elements. Also, a cleaning blade(s) could be mounted in engagement with the top roller as well as the bottom roller. Further, the rollers need not be motor driven but may be driven by manually pulling a film unit through the bite between the rollers.

What is claimed is:

1. Apparatus for spreading a processing liquid across an exposed area of a photographic film unit so as to initiate the formation of a visible image therein while simultaneously advancing the film unit from its exposure position, said apparatus comprising:

a housing;

means mounted within said housing for supporting first and second elongate rollers in juxtaposed relation such that their peripheral surfaces define a pressure-generating gap into which an exposed film unit is adapted to be advanced;

first and second elongate rollers coupled to said supporting means in juxtaposed relation for rotation about their longitudinal axes, said first and second elongate rollers being adapted to spread a processing liquid across the width of an exposed film unit, as it passes therebetween, so as to initiate the formation of a visible image therein;

cleaning means mounted adjacent said first elongate roller and engageable with the peripheral surface of said first roller for removing particulate material from said peripheral surface as said first elongate roller is being rotated about its longitudinal axis; and said supporting means includes means for supporting said first elongate roller for movement into engagement with said cleaning means as an exposed film unit is moved between said first and second elongate rollers, and out of engagement with said cleaning means as the film unit moves out from between said first and second elongate rollers.

2. Apparatus as defined in claim 1 wherein said cleaning means comprises a pair of wiper blades mounted adjacent opposite ends of said first elongate roller.

3. Apparatus for spreading a processing liquid across an exposed area of a photographic film unit so as to initiate the formation of a visible image therein while simultaneously advancing the film unit from its exposure position, said apparatus comprising:

a housing;

means mounted within said housing for supporting first and second elongate rollers in juxtaposed relation such that their peripheral surfaces define a pressure-generating gap into which an exposed film unit is adapted to be advanced;

first and second elongate rollers coupled to said supporting means in juxtaposed relation for rotation about their longitudinal axes, said first and second elongate rollers being adapted to spread a processing liquid across the width of an exposed film unit, as it passes therebetween, so as to initiate the formation of a visible image therein;

cleaning means mounted adjacent said first elongate roller and engageable with the peripheral surface of said first roller for removing particulate material from said peripheral surface as said first elongate roller is being rotated about its longitudinal axis; and means defining an exit in said housing through which an exposed film unit is adapted to be advanced to the exterior of said housing subsequent to passing between said first and second elongate members, and said cleaning means comprises a resilient member having first and second opposite ends, said first end being adapted to cooperate with a wall of said exit so as to releasably hold an exposed film unit by an end thereof after it has moved out of engagement with said first and second elongate rollers while said second end is adapted to engage and remove particulate material from said first elongate roller during passage of the exposed film unit between said first and second elongate rollers.

4. Apparatus as defined in claim 3 wherein said cleaning means comprises a resilient member located adjacent opposite ends of said first elongate roller.

* * * * *